May 14, 1957  F. KRAISSL, JR  2,792,118
STRAINERS
Filed Nov. 24, 1953  2 Sheets-Sheet 1

INVENTOR.
FREDERICK KRAISSL, JR.
BY
ATTORNEY

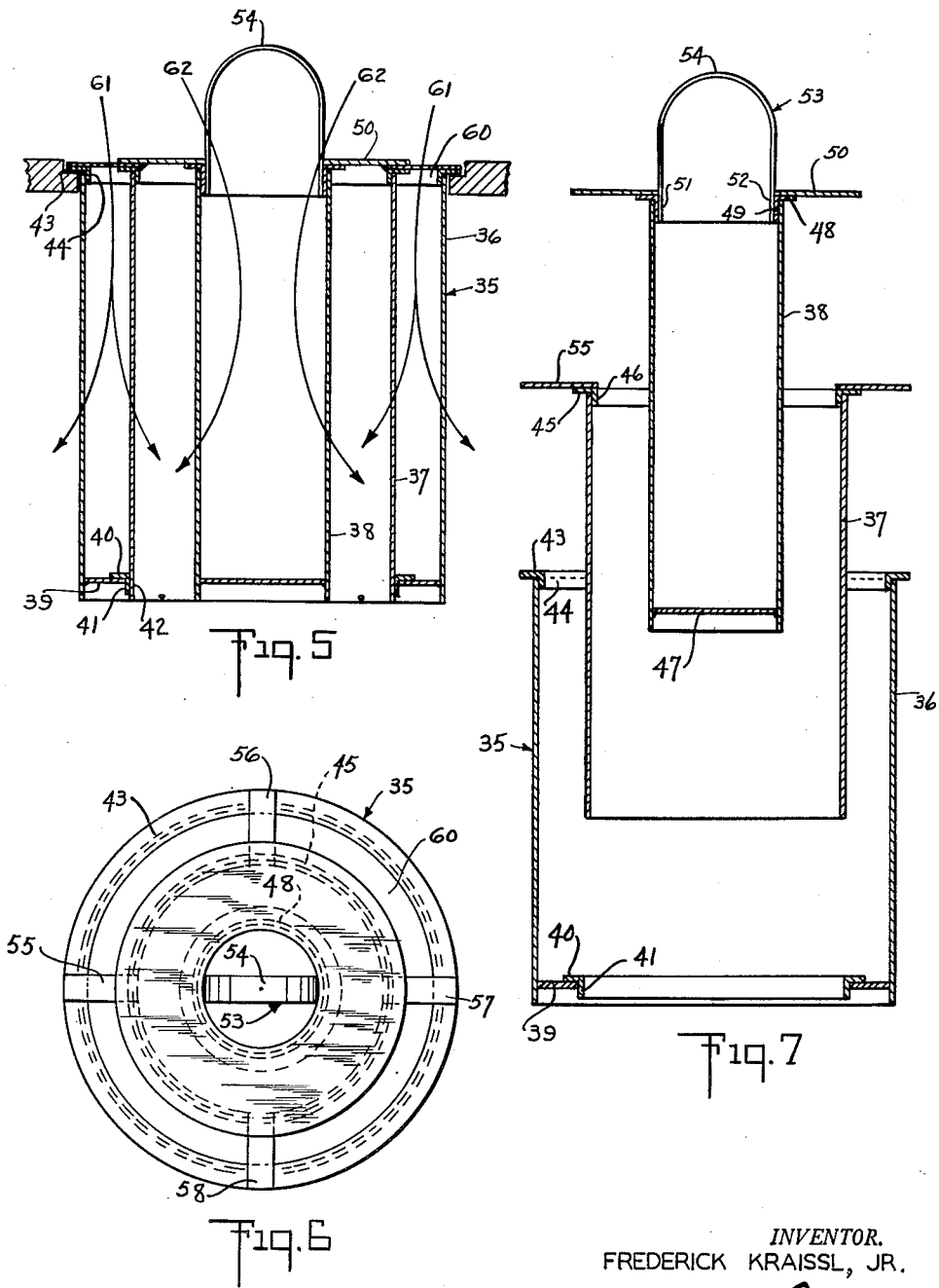

United States Patent Office 2,792,118
Patented May 14, 1957

2,792,118
STRAINERS
Frederick Kraissl, Jr., North Hackensack, N. J.
Application November 24, 1953, Serial No. 394,080
2 Claims. (Cl. 210—238)

This invention relates to improvements in strainer or filter baskets and has for an object the provision of such baskets wherein the elements having concentric walls forming strainers or filters separable in order to facilitate cleaning them.

Another object of the invention is the provision of strainer baskets in which the circular walls of said baskets are normally in detachable fixed relation and when said walls, which constitute very substantial portions of the strainer surface, need cleaning they may be detached for that purpose.

A further object of the invention is the provision of a strainer device which includes at least two adjacent cylindrical members having cooperative lower end portions which detachably secure them together, and a flange on the upper end of one of them for supporting said device in a casing, and means on the upper end of the other cylindrical member cooperating with said flange and including an upstanding loop or handle to be engaged by a detachable closure plate on said casing.

Yet another object of the invention is the provision in a strainer or filter of the character described, comprising three or more concentric cylindrical members detachably held in cooperative relation.

Other objects and advantages of the invention will be apparent to those skilled in the art, upon a study of the following specification and the accompanying drawings.

Referring to the drawings which are given by way of example to illustrate the invention:

Figure 5 is a cross-sectional elevation of a modified form of strainer or filter wherein three concentric elements are employed;

Figure 6 is a plan view of the strainer or filter basket of Figure 5; and

Figure 7 is an elevation of the strainer or filter device of Figure 5; and

Figure 1:
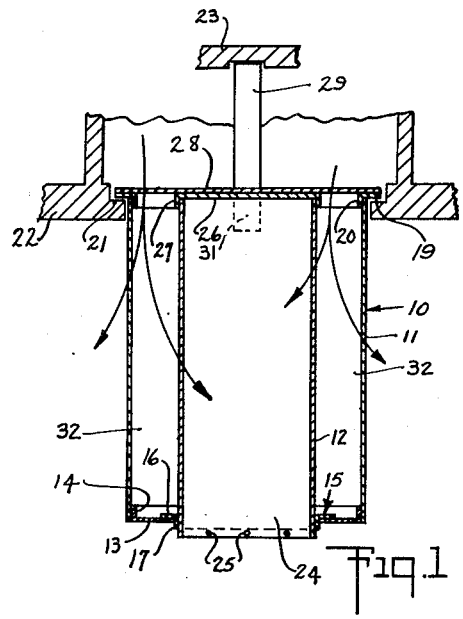
Figure 1 is a cross-sectional elevation of a strainer basket comprised of two concentric cylindrical strainer or filter elements.
Figure 2:
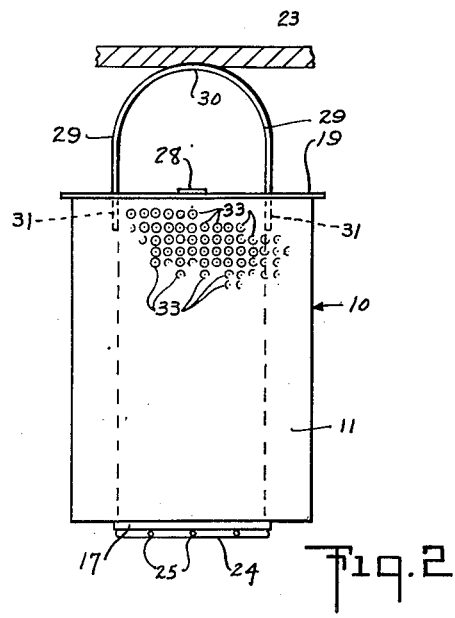
Figure 2 is an elevation of the strainer basket of Figure 1.
Figure 3:
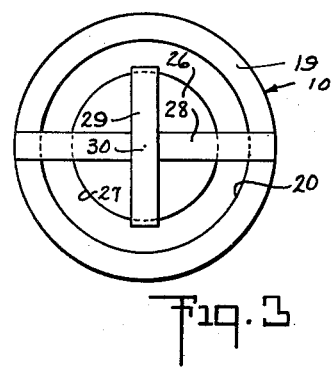
Figure 3 is a plan view of the said strainer basket.
Figure 4:
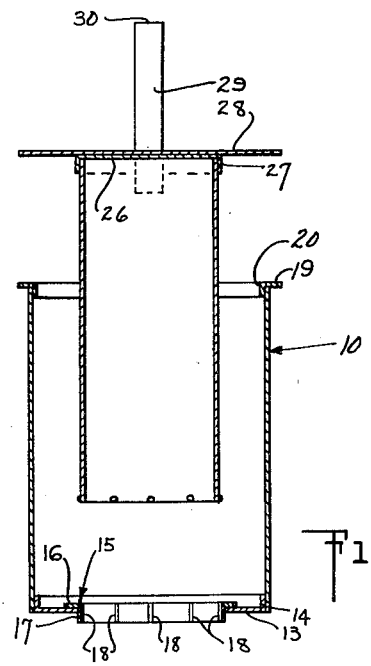
Figure 4 is a view showing the inner element being detached and separated from the outer element to facilitate the cleaning of the surfaces thereof.

In the drawings, the sectional views appear to indicate that the cylinders are made of solid metal, however, they are made of perforated metal or fine mesh screen, or a combination of both, and the sections are considered to be taken along vertical lines between the perforations.

Referring first to Figures 1 to 4, my strainer or filter basket device 10 is mainly comprised of an outer cylindrical strainer or filter element 11 and an inner element 12 to be presently described. The element 11 has a base portion 13 which is generally in the form of an annular ring having an outer flange 14 which is secured to the element 11 near the lower end thereof.

Forming a fit within the inner periphery of the ring 13 is a second ring 15 which has a horizontal body portion 16 which is also secured to the ring 13, and a vertical flange portion 17 into which the lower end of the element extends and carrying a series of grooves 18 as will presently be explained.

A ring flange member 19 has a depending annular portion which is secured to the upper end of the element 11. The flange 19 is provided to engage an annular ledge, such as the ledge 21 in a casing 22 for example.

The inner element 12 has its lower end 24 open and adjacent thereto is a series of dents or the like 25 which by way of example engage the grooves 18 and detatchably secure the element 12 in substantially concentric relation with the cylindrical element 11.

A closure disc 26 has a depending flange portion 27 which fits and is secured to the upper end of the inner element 12.

A V-shaped handle 29 has its free ends 31 secured to the element 12 near its upper end in any suitable manner, for example by brazing, by welding or by spot welds. The apex 30 of this handle is usually engaged by a depression in a detachable sealed porthole 23 in the casing 22. This urges the cross member 28, secured on the closure member 26 against the outer flange 19 and thereby firmly holds both elements in substantially concentric, cooperative relation in said casing.

There is a space 32, between the walls of elements 11 and 12, which is open on its upper end, and closed by the annular ring 13 on its lower end, so the path of a fluid medium to be strained or filtered is into the annular space 32 and thence through the circular walls of elements 11 and 12, as shown by the arrows, and through the annular ring portion 13 at the bottom.

Now, after a period of time these surfaces may become clogged so as to need cleaning. Since the inner element is detachably engaged with the outer element, they may be easily separated to facilitate the cleaning operation, following which they may be re-engaged and replaced in the casing.

Figure 8:
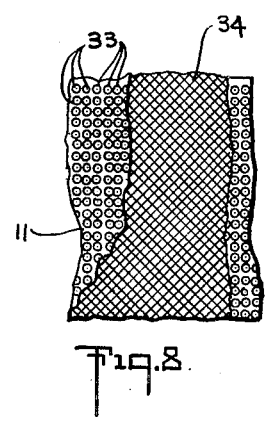
Figure 8 is a fragmentary view of a strainer wall formed of perforate metal and having a filter lining therein.

The elements, when to be used as strainers, may be made of a perforated metal having perforations 33 of a desired fineness. When they are to be used as filters, in some applications they may be additionally provided with very fine mesh materials such as those shown at 34 in Figure 8.

Referring to the modifications shown in Figures 5, 6 and 7, the filter device 35 includes three concentric elements 36, 37 and 38, the element 36 being outermost and the element 37 being the intermediate one.

The outer element 36 has an annular ring portion 39 welded, soldered or otherwise secured thereto adjacent to its lower end, and secured to the inner periphery of 39 is a ring portion 40 secured to 39 adjacent to said periphery, and having a depending portion 41 which is engaged by the lower end portion 42 of the element 37.

Secured on the upper end of element 36 is a flange member 43 by means of a depending annulus 44 which is welded or otherwise suitably fixed thereto.

Secured on the upper end of the element 37 is a flange member 45 which has a depending annulus 46 secured thereto in any suitable manner. The lower end of element 37 may be provided with suitable elements which will form with other cooperative elements in the depending portion 41 to detachably secure said lower end to the portion 41.

The inner element 38 has a closure plate 47 soldered, welded or otherwise secured in its lower end. The upper end of the element 38 has secured thereto an annular flange 48 which has a depending annulus 49 formed integral therewith, and secured to the flange 48 in any suitable manner is an annulus 50 which is of sufficient diameter to span the space between the outer wall of the element 38 and the inner wall of the element 37. Secured to the depending annulus 49 are the extremities 51 and 52 of a U-shaped handle 53. The U-shaped handle has an apex 54 which is similar to the apex 30 shown in Figure 2 and both of these apexes perform the same functions.

Secured on the flange number 45 is a series of metallic strips 55, 56, 57 and 58. Although I show four strips I am not limited to any specific number as they may vary in number from two on up depending on the diameters of the strainer baskets. These strips rest on the flange 43 when the strainer is assembled as shown in Figure 5 and perform the double function of holding the element 35 down and at the same time centralizing it and the element 37. The cover of the casing in which the assembly is mounted engages the apex 54 of the handle 53 and directly holds the element 38 down, and through the medium of the annulus 50 holds the element 37 down. Thus the elements are positively held in cooperative relation by the cover of the case.

The flow of the fluid through this form of strainer or filter is into the annular space 60 and into the opening defined by the depending annulus 49 as shown by the arrows 61 and 62 respectively. When the filters or strainers become clogged and need cleaning the casing is opened up and the whole assembly is removed from the casing following which the inner element 38 may be removed as shown in Figure 7 and following this the intermediate element 37 may be removed thereby making all of the straining or filtering surfaces readily accessible for cleaning.

Although I have shown and described one form of strainer or filter basket, and a modification thereof, it will be obvious that many changes may be made in the arrangements shown and described within the scope of the following claims.

I claim:

1. In a strainer, an openable enclosure having an annular ledge therein to form a support, an outer cylindrical body having perforate walls, an annular flange carried by the upper end of said body and extending outwardly therefrom and adapted to engage an annular support, a second flange in the form of an annulus secured to the lower end of said body and extending inwardly to form a partial closure therefor, a central hole formed in said annulus, said hole being in the form of a socket, a second cylindrical body also having perforate walls and having its lower end detachably engaging said socket, closure means secured on the upper end of said second body, a cross-member mounted on the closure means of said second body and adapted to engage the flange on the upper end of said first body, when the lower end of said second body is engaged with said socket, and a U-shaped handle secured to the upper end of the said body and adapted to be engaged by a movable element of said enclosure for holding said strainer on said ledge within said enclosure.

2. A strainer according to claim 1 in which the said cross-member mounted on the closure means of said second body forms a stop which limits the depth that the lower end of said second body may extend into said socket.

References Cited in the file of this patent

UNITED STATES PATENTS

| | | |
|---|---|---|
| 1,507,929 | Mosher | Sept. 9, 1924 |
| 1,564,666 | Griffin | Dec. 8, 1925 |
| 1,565,988 | Cottrell | Dec. 15, 1925 |
| 2,442,818 | Lyman | June 8, 1948 |
| 2,448,157 | Schneider | Aug. 31, 1948 |